Figure 1:
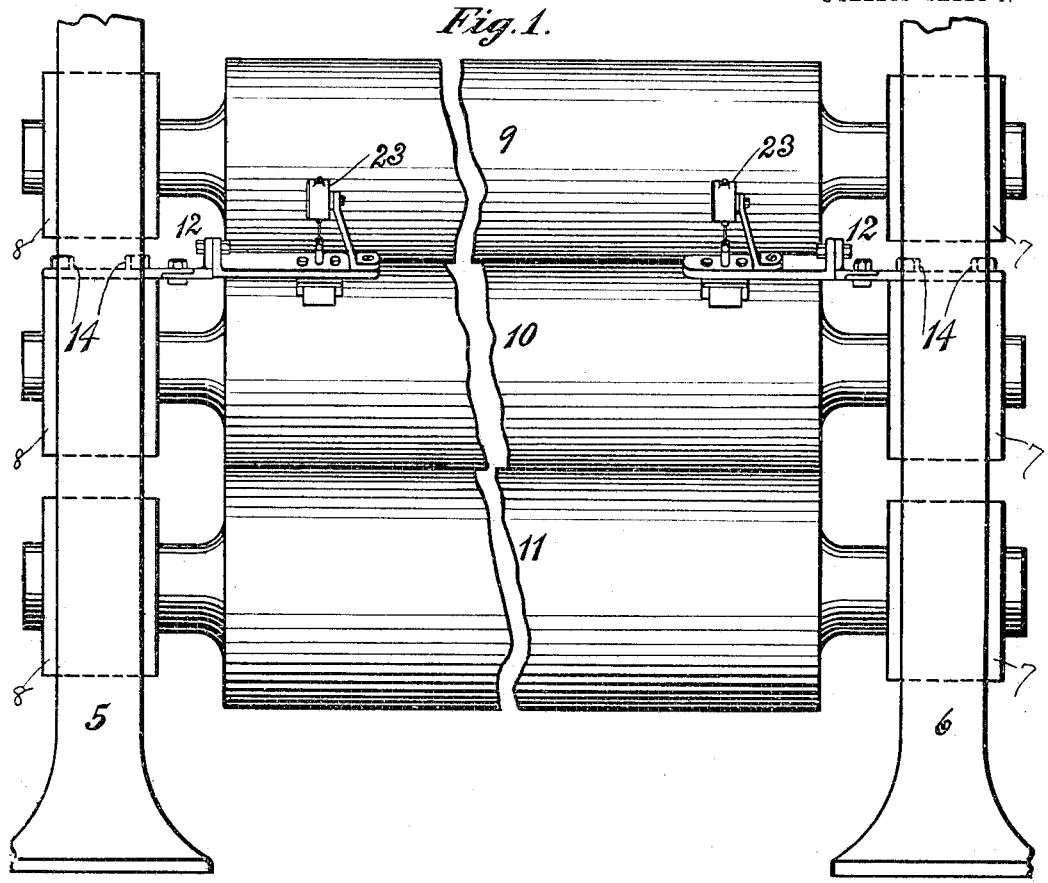

No. 793,027. PATENTED JUNE 20, 1905.
H. H. & J. L. BURTON.
INDICATING ATTACHMENT FOR ROLLING MILLS.
APPLICATION FILED MAY 18, 1904.

2 SHEETS—SHEET 1.

Witnesses:
F. E. Anderson.
Frances E. Blodgett.

Inventors:
Harry H. Burton  J. Leslie Burton
By their Attorney,

No. 793,027. PATENTED JUNE 20, 1905.
H. H. & J. L. BURTON.
INDICATING ATTACHMENT FOR ROLLING MILLS.
APPLICATION FILED MAY 18, 1904.
2 SHEETS—SHEET 2.
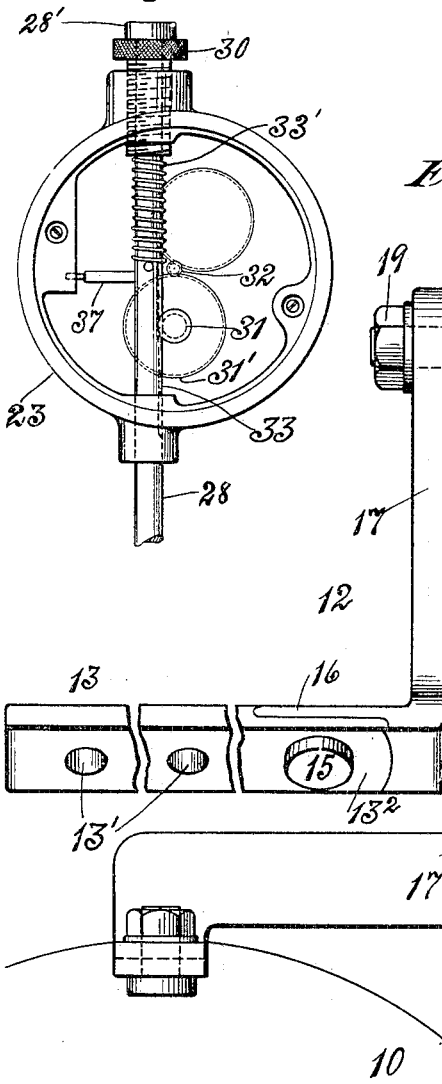
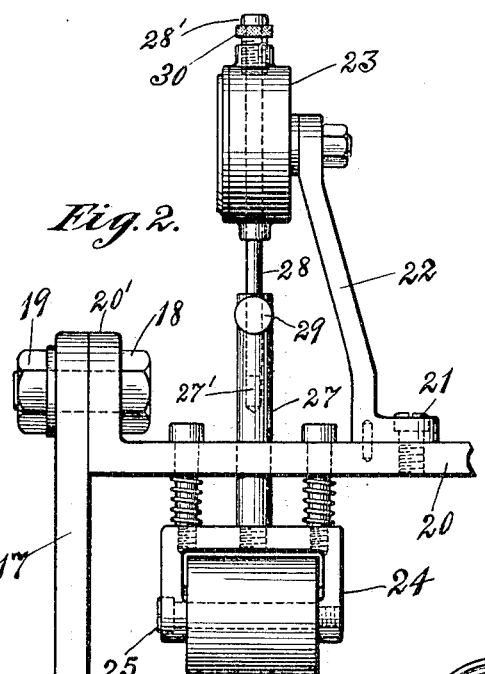
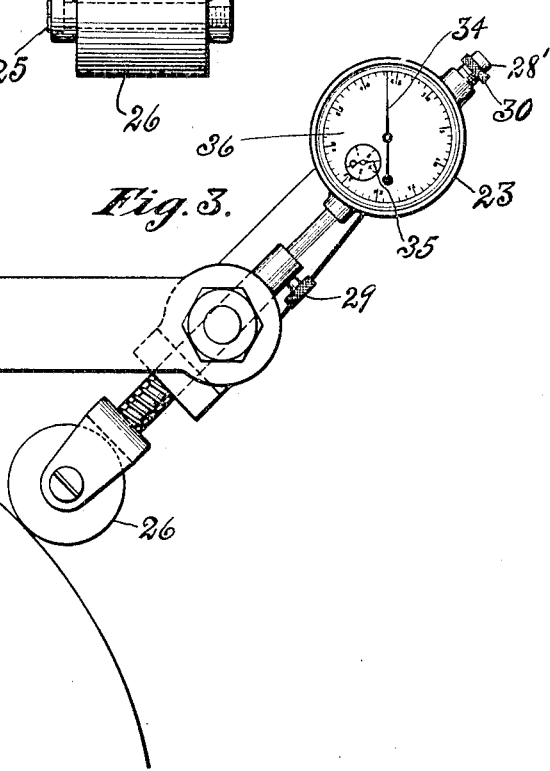
Witnesses:
F. E. Anderson
Frances E. Blodgett
Inventors:
Harry H. Burton  J. Leslie Burton
By their Attorney,
W. H. T. Blodgett No. 793,027.                                           Patented June 20, 1905.

UNITED STATES PATENT OFFICE.

HARRY H. BURTON, OF SOUTHFORD, AND JAMES LESLIE BURTON, OF NEW BRITAIN, CONNECTICUT; SAID JAMES LESLIE BURTON ASSIGNOR TO SAID HARRY H. BURTON.

INDICATING ATTACHMENT FOR ROLLING-MILLS.

SPECIFICATION forming part of Letters Patent No. 793,027, dated June 20, 1905.

Application filed May 18, 1904. Serial No. 208,601.

*To all whom it may concern:*

Be it known that we, HARRY H. BURTON, residing at Southford, New Haven county, and JAMES LESLIE BURTON, residing at New Britain, in the county of Hartford, State of Connecticut, citizens of the United States of America, have invented certain new and useful Improvements in Indicating Attachments for Rolling-Mills, of which the following is a specification.

Our invention relates to means for indicating the thickness of material passing through rolls, and it may be employed with rolling-mills of any desired kind—for instance, those used for calendering paper, for rolling sheet metal, and for reducing other materials.

Frequently it happens that material leaving the rolls varies in gage, or, in other words, will be thicker than the standard size required at one point and thinner at another point. Heretofore it has been necessary to remove the material from the rolls at intervals and submit it to independent measurements for determining the gage, and this requires vexatious loss of time, with its attendant expense, and in paper-rolling or calendering machines considerable waste of material, sections of which are torn off for measuring purposes.

Our invention has for its object the provision of means for indicating the gage of the stock immediately subsequent to its passage between the rolls, so that if inequalities exist in said stock they will at once be made known and the rolls may be adjusted to correct them and produce stock of thickness of the standard gage required.

A further object of the invention is the provision of a support attached to a box of one of the rolls and of indicating devices carried by said support, said indicating devices including an element for bearing upon stock just after it emerges from between two reducing-rolls and an indicator actuated by said element.

A further object of the invention is the provision of devices for indicating variations in stock passing through reducing-rollers, said devices including a yieldingly-mounted roller bearing against the stock as it emerges from the rolls and an indicator actuated by the movements of said roller.

A further object of the invention is the provision of a swinging support for the indicator, whereby it may be moved out of the way when it is desired to inspect the rolls or to remove material upon which they are in action.

A further object of the invention is the provision of adjustable stop devices whereby the indicator may be first accurately set to the gage required and will then indicate variations in the thickness of the material on either side of the line to which the pointer of said indicator has been adjusted.

Other objects of the invention will be set forth in the following description.

Figure 5:
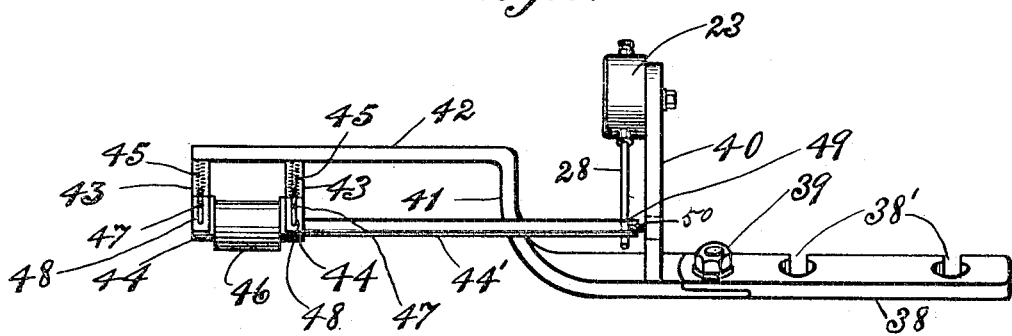

In the accompanying drawings, Figure 1 is a side elevation of two of the rolls of a paper-calendering machine with which the invention may be employed, the upper rolls of the set being omitted. Fig. 2 is a side view of one form of the improved indicating attachment. Fig. 3 is a front view thereof, showing the face of the indicator. Fig. 4 is a rear view of a form of indicator that may be employed. Fig. 5 is a side view of another form of attachment.

Like numerals designate similar parts throughout the several views.

Referring to the drawings, the numerals 5 and 6 designate the housings of a set of rolls, and 7 and 8 the boxes in which said rolls are journaled. As shown, the rolls designated, respectively, by 9, 10, and 11, are the last three of a set of five usually employed in calendering paper, the two upper rolls of said set not being illustrated. Here it is, however, to be stated that the invention is limited to no specific use, for it is applicable to rolling-mills generally wherever it is desirable to indicate the thickness or gage of the material undergoing reduction. Rolls 9 and 10 in the mill illustrated are those between which the last reduction of the paper is effected, and the roll 11 is merely a smoothing or planishing roll.

In Figs. 1, 2, and 3 the improved indicating attachment consists of an angular bracket, designated in a general way by 12 and comprising an arm 13, perforated at 13' to receive bolts 14, by which the arm is secured to the upper cap of the box in which the roll 10 is journaled. The arm 13 is reduced at its inner end to form a lip 13², upon which is pivoted at 15 a short complemental arm 16, projecting from a bar 17. To the end of said bar 17 is connected, preferably by a pivot-bolt 18 and nut 19, a carrier 20, having an angular extension 20', through which the bolt 18 passes, and to said carrier 20 is bolted at 21 a standard 22, to the upper end of which is secured an indicator 23, which may be of any suitable kind.

Designated by 24 is a box in which is journaled for loose rotation upon a pin or bolt 25 a roller 26, said box being secured to the end of a rod 27, chambered at its upper end at 27' to receive a rod 28 for actuating, by means hereinafter described, the indicator. A set-screw 29 passes through a wall of the chamber 27', and the end thereof engages the rod 28 and serves adjustably to secure said rod in place for a purpose hereinafter described. At its upper extremity the rod 28 is headed at 28', and in the top of the indicator-casing an adjustable thimble 30 is inserted to act as a stop to limit the downward movement of said rod 28.

Any suitable mechanism may be employed for actuating the pointers of the indicator; but for illustrative purposes we have shown in Fig. 4 a well-known mechanism comprising intermeshing pinions 31, 31', and 32, said pinions being actuated in one direction by a rack 33, carried by rod 28, and in the opposite direction by a spring 33'. To the barrel of the small pinion 32 the large pointer 34 is secured, while the pinion 31 actuates the small pointer 35. A suitably-graduated dial 36 is carried by the case, and the pointers co-operate therewith to indicate the measurement in a well-known manner. A pin 37, projecting from the rod 28 and entering a slot in the case, prevents axial rotation of said rod.

Two attachments are usually employed, one at the inner side of the housing 5 and the other on the interior of the housing 6, the indicators being so arranged that both are in the same line of sight, and as both are exactly alike they are designated by the same numerals.

In the form of attachment designated by Fig. 5 a plate 38 is slotted at 38' to be secured by bolts to the journal-box, and this plate is provided with a pivoted connection 39, similar to that shown in Fig. 2 and for the same purpose. A standard 40 rises from the inner section of the plate, and upon it is carried the indicator 23 and its rod 28. Beyond the inner section of the plate it is bent at an angle, as at 41, and is then extended in a right line, as at 42. Secured to the under side of extension 42 are slotted hangers 43, in which are fitted journal-boxes 44, normally forced downward by springs 45, one for each box, which bear against the under sides of the top of the hangers. Each box 44 is perforated to receive a rod 44', which is passed through both boxes and through the bore of a roll 46, located between the hangers and loosely rotatable on the rod. To prevent the roll 46 from dropping out of the slots in the hangers, a pin 47 is provided in each box, which enters a limiting-slot 48 in the hanger. At its inner end the long rod 44' is connected at 49 to the rod 28 of the indicator, said rod 28 being inserted in an opening in the rod 44' and secured in place by a set-screw 50.

In operation both forms of the attachment work in a similar manner, and either one or two may be employed with the rolling-mill, as circumstances require. If employed with a paper-calendering mill, the box 24 will first be permitted to drop until the roller 26 engages, for instance, the roll 10, and the rod 28 and stop 30 are then adjusted to bring the pointer to "50" on the dial shown, or to some other mark—for instance, "0" on another form of dial—after which the set-screw 29 is tightened to secure the rod in position. Now, of course, as the material passes over the roll 10 the roller 26 will be lifted if it is thicker than the standard size and will be lowered if thinner than the standard which the rolls are set to produce, and the pointer will indicate the variations. For instance, if material of 15 gage is being rolled, the pointer 34 should always indicate "15" on the dial; but if variations occur in thickness of product it will pass below "15" if the material is too thin and above "15" should it be too thick, thus enabling the operator to ascertain at a glance just what character of work is being produced and to make the necessary adjustments of the rolls to bring the work back to standard.

Should it be necessary to move either or both indicating attachments out of the way, this may readily be done by loosening the nuts on bolt 15 and swinging the attachment to one side, and should the roller 26 not be in the exact position required the carrier 20 may be adjusted on bolt 18 and then again clamped in position by nut 19.

Changes may be made in the form and proportions of the parts, they may be disposed in different relations, and may be employed in connection with the reducing-roll of any desired mill to which the invention is adapted without departure from the invention.

Having thus described our invention, what we claim is—

1. The combination, with a rolling-mill, of a plate secured to one of the roll-boxes, and projecting laterally therefrom; a device pivoted to said plate; a roller carried by said device; an indicator; and means actuated by said roller for operating the indicator.

2. The combination, with a rolling-mill, of a plate secured to one of the boxes of the mill, and projecting laterally therefrom; a device adjustably connected to said plate; a movable roll carried by said device; a standard rising from said device; an indicator secured to the standard; and a rod actuated by the roll, and serving to operate said indicator.

3. The combination, with a rolling-mill, of a plate bolted to the journal-box of one of the rolls of said mill; a bar movably connected to said plate; a standard rising from the bar; an indicator carried by the standard; a roller yieldingly mounted on said bar; and means for connecting the roller with the pointer of the indicator.

4. An indicating attachment for rolling-mills comprising a plate; a bar connected to said plate for swinging movement thereon in a horizontal plane; a standard rising from said bar; an indicator secured to the standard; mechanism for actuating the pointer of said indicator; a rod constituting a part of said mechanism; a roll carried by the bar; and means for connecting the roll with said rod.

5. The combination, with a reducing-roll of a rolling-mill and its journal-box, of a plate secured to said journal-box, and projecting laterally from the inner side thereof; a bar projecting from said plate to a point opposite a portion of the periphery of the roll; a roller yieldingly mounted on said bar; a standard carried by the bar; an indicator secured to the standard; mechanism for actuating said indicator; and a rod controlled by the roll for operating said mechanism.

6. The combination, with a reducing-roll of a rolling-mill and its journal-box, of a plate bolted to said journal-box; a bar secured to said plate for pivotal movement thereon toward and from the reducing-roll; a yieldingly-mounted roller carried by said bar; a support on said bar; an indicator secured to said support; a rod projecting from the indicator; means for connecting said rod with the yieldingly-mounted roller; and mechanism actuated by the rod for operating the pointer of the indicator.

7. The combination, with a reducing-roll of a rolling-mill and its journal-box, of a plate secured to said journal-box; a bar pivoted to said plate; an antifriction-roller carried by the bar, and adapted to bear upon the material passing from the roll; means on the bar for supporting said antifriction-roller; springs for normally forcing the roller-supporting means toward the roll; an indicator; and devices for connecting the indicator with the roller-supporting means.

8. The combination, with a reducing-roll of a rolling-mill and its journal-boxes, of plates secured to said journal-boxes and projecting laterally toward each other between the housings of the mill; devices adjustably connected to said plates; standards rising from said devices; indicators carried by the standards, and located between the housings of the mill; rods depending from said indicators; mechanism controlled by said rods for actuating the pointers of the indicators; and rollers carried by said devices, and connected with said rods.

9. The combination, with the reducing-roll of a rolling-mill and its journal-box, of a bar secured to said journal-box; and an indicating attachment pivoted to said bar, said attachment comprising a carrier; a standard on said carrier, an indicator carried by the standard, a rod for actuating the indicator, a roller, means for yieldingly supporting said roller, and devices for connecting the roller-supporting means with the indicator.

10. The combination, with a reducing-roll and its journal-box, of a plate secured to said journal-box; a device pivotally connected to said plate; a standard rising from said device; an indicator secured to the standard; mechanism including a rod for actuating said indicator; an adjustable stop for limiting the movement of the rod; a yieldingly-mounted roller; means for supporting said roller; and means for adjustably connecting the roller-support with the rod.

11. The combination, with a reducing-roll of a rolling-mill and its journal-box, of a plate secured to said journal-box; a bar having an arm pivoted to said plate; a carrier pivoted to said bar; a roller yieldingly supported by the carrier; an indicator mounted on the carrier; and means operated by the roller for actuating said indicator.

In testimony whereof we affix our signatures in presence of two witnesses.

HARRY H. BURTON.
JAMES LESLIE BURTON.

Witnesses:
J. D. WOOD,
CHAS. F. SCHMELZ.